(12) United States Patent
Nawathe

(10) Patent No.: US 11,144,288 B1
(45) Date of Patent: Oct. 12, 2021

(54) SYSTEM AND METHOD FOR COMPILING RULES SET INTO BYTECODE USING SWITCH AND CLASS HIERARCHIES

(71) Applicant: ADOBE INC., San Jose, CA (US)

(72) Inventor: Sandeep Nawathe, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/874,942

(22) Filed: May 15, 2020

(51) Int. Cl.
*G06F 8/41* (2018.01)

(52) U.S. Cl.
CPC ............... *G06F 8/44* (2013.01); *G06F 8/447* (2013.01)

(58) Field of Classification Search
CPC ............................. G06F 8/40–51; G06F 8/72
USPC ........................................ 717/118, 140–161
See application file for complete search history.

(56) References Cited

U.S. PATENT DOCUMENTS

| | | | |
|---|---|---|---|
| 5,999,739 A * | 12/1999 | Soni | G06F 8/443 712/234 |
| 6,477,683 B1 * | 11/2002 | Killian | G06F 8/41 716/106 |
| 7,316,008 B1 * | 1/2008 | Dutta | G06F 8/74 717/136 |
| 2011/0099535 A1 * | 4/2011 | Buckley | G06F 8/4441 717/114 |
| 2017/0235556 A1 * | 8/2017 | Edler Von Koch | G06F 8/4435 717/159 |
| 2019/0056919 A1 * | 2/2019 | Pan | G06F 16/901 |

OTHER PUBLICATIONS

Shi, Y., et al., Virtual Machine Showdown: Stack Versus Registers, ACM Transactions on Architecture and Code Optimization, vol. 4, Issue, Jan. 4, 2008, pp. 153-163, [retrieved on Jun. 29, 2020], Retrieved from the Internet: <URL:http://dl.acm.org/>.*

Zhao, P. et al., Feedback-Directed Switch-Case Statement Optimization, International Conference on Parallel Processing Workshops (ICPPW'05), Jun. 14-17, 2005, pp. 1-8, [retrieved on Jun. 29, 2020], Retrieved from the Internet: <URL:http://ieeexplore.ieee.org/>.*

GCC, the GNU Compiler Collection, 4.3 Compiler Switches, Web page <https://gcc.gnu.org/onlinedocs/gcc-6.3.0/gnat_ugn/Compiler-Switches.html>, 1 pages, Oct. 28, 2017, retrieved from Internet Archive Wayback Machine <https://web.archive.org/web/20171028002839/https://gcc.gnu.org/onlinedocs/gcc-6.3.0/gnat_ugn/Compiler-Switches.html> on May 22, 2020.

(Continued)

*Primary Examiner* — Geoffrey R St Leger

(74) *Attorney, Agent, or Firm* — Shook, Hardy & Bacon L.L.P.

(57) ABSTRACT

Embodiments of the present disclosure are directed to a system, methods, and computer-readable media for compiling source code into bytecode using a compiler. Using a rules set as input, a compiler de-duplicates action codes in the rules and assigns a unique identifier to each action code. The compiler generates a cascading hierarchy of switches that process discrete portions of the unique identifiers in order to invoke methods. The methods are assigned to classes using a method-per-class limit, and bytecode is generated from the class-assigned methods.

20 Claims, 4 Drawing Sheets

(56) References Cited

OTHER PUBLICATIONS

Nick Melis, "Java Switch Statement", Web page <https://www.baeldung.com/java-switch>, 10 pages, May 7, 2019, retrieved from Internet Archive Wayback Machine <https://web.archive.org/web/20190827121727/https://www.baeldung.com/java-switch> on May 22, 2020.

* cited by examiner

SYSTEM AND METHOD FOR COMPILING RULES SET INTO BYTECODE USING SWITCH AND CLASS HIERARCHIES

BACKGROUND

Generally, a compiler performs a complex operation in order to compile a rules set file into an object of a particular class. The compiler provides the object of the particular class to an engine or virtual machine. Then, the engine or virtual machine executes the rules stored in the object against facts to determine when the facts satisfy conditions specified in the rules. When a condition of a rule is satisfied, an action specified by the rule is initiated or performed.

SUMMARY

Embodiments of the present invention relate to, among other things, systems and methods for compiling source code into bytecode in a manner that overcomes the technological limitations and problems resulting from other compiler techniques. In embodiments, the compiler obtains a rules set file and assigns unique identifiers to de-duplicated action codes in the rules set file. In an embodiment, the compiler generates a cascading hierarchy of switches that process a limited quantity of bits of the unique identifiers for the de-duplicated action codes, and that assign the methods invoked for the action codes to a hierarchy of derived classes while utilizing a predefined method per class limit.

It will be understood that this summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
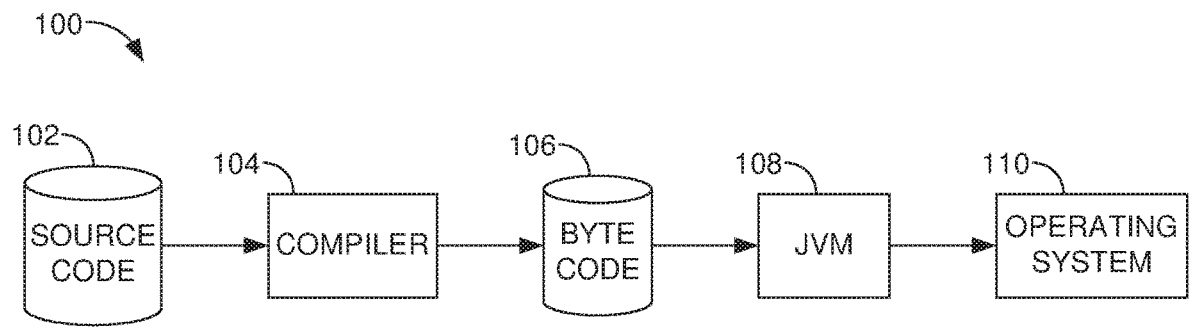
FIG. 1 depicts an example of a computing environment for implementing embodiments, in accordance with the present invention.

Various terms are used throughout this description. The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Overview

Generally, a compiler is a specialized computer program that compiles source file (e.g., a rules set of computer programming code that encodes rules for a decision making system) into output of an instruction set to be run by an engine or virtual machine, the output being "bytecode." The rules set, which serves as the input to the compiler, may include a plurality of rules, each rule having one or more conditions and one or more actions specified for invocation when a condition is satisfied as "true" or "false" based on input facts. A condition may be encoded as a predicate. The bytecode, which is the output generated by the compiler, may be output as a class file (i.e., a Java file having the extension of ".class"). The bytecode may subsequently be run using a rules engine or virtual machine, for example.

However, some compilers operate with built-in technological limitations that cause failures or errors to issue. For example, switch statements are limited within Java compilers. The terms "switch," "switch statement," and "switch expression" are used interchangeably herein to refer to a computer programming statement in source code that operates as a control mechanism which, based on the value for a particular variable, is used to select and execute different branches or portions of source code. A switch can be used, for example, to replace multiple if-then constructs within computer programming source code. With regard to Java compilers, a switch statement cannot exceed a predefined symbol length, and this technological limitation creates a technological problem. In such an example, when the predefined symbol length of a switch statement is exceeded during compilation, a compiler error will occur. In other words, the compiler will fail when attempting to utilize the switch statement. This symbol length violation may occur when a large quantity of rules in a rules set are being compiled by the compiler, for example. Other proposed solutions to overcoming the symbol length limit on switch statements failed and generated additional technological problems. For example, generating different functions as a substitute for switch statements, thereby attempting to evade the symbol length limit, resulted in a huge volume of methods being generated and this function volume of methods causes a Java class compiler to become overloaded. As such, the performance of the compiler suffers and degrades. Yet another proposed solution attempted to overcome the technological problem caused by the use of functions as a substitute to switch statements but it also failed and generated further additional technological problems. For example, generating a multitude of classes, subclasses, and sub-subclasses for the action codes in a rules set was attempted. However, this resulted in the creation of a large volume of "small" (i.e., 1000+ classes of small size in kilobytes) classes, and this small-size class volume caused the Java runtime loader to become overloaded. As such, the performance of the compiler suffers and degrades. Further still, generating one very "large" (i.e., size in kilobytes) class that includes all the action codes when compiling a large rules set (e.g., scale of 10,000+ or 100,000+ rules) also failed to cure the defects above because a total class size limit is enforced upon the compiler (e.g., a hard size limit of 65 kilobytes for any one class). Accordingly, there is demonstrated need in the technological field to overcome these technological problems that result from the built-in technological limitations and inherent requirements, discussed above, and other techniques have failed to succeed.

Embodiments herein overcome the technological problems and limitations above. At a high level, embodiments generate a cascading hierarchy of multiple switches, where the hierarchy of switches evaluate and compile a rules set into bytecode, each switch handling only a portion of an action code identifier for an action code in an individual rule. Utilizing the hierarchy of switches as a technological solution, the technological problems resulting from the symbol length limits of switch statements are overcome, as further discussed herein. Additionally, embodiments herein generate a hierarchy of classes in tandem with a method per class limit. Utilizing a method per class limit when generating the hierarchy of classes, as a technological solution, prevents the proliferation of a myriad quantity of small-sized classes that would overload a class loader, and also circumvents the total class size limit imposed on a compiler. For example, methods that are invoked, based on the hierarchy of switches operating, can be assigned across a hierarchy of derived class files, where each class handles a portion of the methods so as to remain within the method per class limit. In this way, the methods are distributed across a lower quantity and/or across the fewest quantity of class files, and each class file remains within the class file size limitation. Thus, utilizing a method per class limit when generating the hierarchy of classes is such that the technological problems resulting from the class proliferation/overload and the class size limit are overcome, as further discussed herein.

Herein, a compiler generates a hierarchy of multiple switches and a hierarchy of classes, using a method per class limit, in order to transform source code of a rules set into bytecode. Accordingly, when source code is received that comprises a plurality of rules, each rule encoding a condition and an action code, the compiler may de-duplicate the action codes and assign a unique identifier to each of the action codes that remain after de-duplication. This reduces the overall quantity of action codes, for example, such that a quantity of 10,000 or more rules in a rules set may comprise only 2000 or fewer unique action codes. Each of the unique identifiers is represented using a quantity of bits, in some embodiments. After de-duplication and the assignment of unique identifiers to the action codes, the compiler may generate a hierarchy of nested switches, in embodiments, in order to process the unique identifiers assigned to the action codes within the rules set.

When processing the unique identifiers assigned to the action codes, the compiler may generate one switch for each n bits (or fewer quantity) of a unique identifier. In one example, for a unique identifier comprising 14 total bits, the compiler may generate a first switch (i.e., switch No) and a second switch (i.e., switch Ni nested one level below switch No), where each switch is configured to handle eight or fewer bits (i.e., the switch statement symbol length limit is not violated). In such an example, the first switch may handle the first portion of seven sequential bits of the unique identifier and then may pass the remaining portion of seven sequential bits of the same unique identifier to the second switch. In another example, the first switch may handle the first portion of eight sequential bits of the unique identifier and then may pass the remaining portion of six sequential bits of the same unique identifier to the second switch. In yet another example, the first switch may handle a first portion of seven sequential bits of a unique identifier and then may pass a second portion of five sequential bits of the same unique identifier to the second switch, which may further pass the remaining two sequential bits of the same unique identifier to a third switch. Any quantity of switches may be generated and nested, and each switch may process the same quantity or a different quantity of bits, in various embodiments.

In embodiments, when all of the bits of the unique identifier are processed by the hierarchy of switches, the compiler may identify the action code that corresponds to the unique identifier that is/has been processed by the hierarchy switches, and may invoke a method that corresponds to that identified action code. In some embodiments, the compiler assigns the method invoked to a hierarchy of classes, where the hierarchy of classes may be generated by the compiler in advance or concurrently with processing of the identifiers. An additional derived class is generated by the compiler within the hierarchy of classes each time that a predefined method per class limit is met (i.e., so that the size limit on a single class is not violated), in embodiments. The compiler performs these aspects of processing for each one of the plurality of unique identifiers that correspond to the de-duplicated action codes, in embodiments, for the entire rules set. In some embodiments, the compiler generates bytecode based on the processing of the action code identifiers and the assignment of methods to classes for the corresponding action codes in the rules set. The bytecode may be generated as a single file, for example, such all the rules from the source code have been transformed into bytecode within one Java ARchive file (JAR file).

Accordingly, embodiments herein provides one or more computer storage media storing computer-useable instructions that, when used by a computing device, cause the computing device to perform operations for compiling rules into bytecode. In the embodiments, the operations comprise receiving a plurality of rules encoding a plurality of conditions and a plurality of action codes. A plurality of unique identifiers are assigned to the plurality of action codes, wherein each of the plurality of unique identifiers is represented using bits, in embodiments. In an embodiment, a hierarchy of switches is generated that comprises a first switch and a second switch nested under the first switch. The plurality of rules is then processed using the hierarchy of switches, in embodiments. In one embodiment, bytecode is generated based on the processing of the plurality of rules using the hierarchy of switches.

Another embodiment provides one or more computer storage media storing computer-useable instructions that, when used by a computing device, cause the computing device to perform operations for compiling rules into bytecode. The operations include, in some embodiments, receiving a plurality of rules encoding a plurality of conditions and a plurality of action codes. In one embodiment, the plurality of action codes for the plurality of rules are de-duplicated. A plurality of unique identifiers are, in an embodiment, assigned to the plurality of action codes subsequent to de-duplication, wherein each of the plurality of unique identifiers is assigned to one of the plurality of action codes, and wherein each of the plurality of unique identifiers is represented using a quantity of bits. In an embodiment, a hierarchy of switches is generated having a switch for each n quantity of bits representing one or more of the plurality of unique identifiers. The hierarchy of switches comprises a first switch and a second switch nested under the first switch, in embodiments, and each of the first switch and the second switch are configured to process n or fewer bits. In some embodiments, the plurality of rules are processed using the hierarchy of switches. For each of the plurality of unique identifiers, a first switch processes a first sequential portion of n or fewer bits of the unique identifier and a second switch processes a second sequential portion of n or fewer bits of the unique identifier, in various embodiments. In an embodiment, when all of the quantity of bits of the unique identifier are processed by the hierarchy of switches, a method for the action code that corresponds to the unique identifier is invoked. The method invoked is assigned to a hierarchy of classes, in embodiments, and an additional class is generated when a predefined method per class limit is met. Bytecode is generated based on the processing of the plurality of rules using the hierarchy of switches, in some embodiments.

In yet another embodiment, a method for compiling rules into bytecode is provided. The method comprises receiving a plurality of rules encoding a plurality of conditions and a plurality of action codes, in embodiments. A plurality of unique identifiers are assigned to the plurality of action codes, in embodiments, and each of the plurality of unique identifiers is represented using bits. In embodiments, a hierarchy of switches is generated that comprises a first switch and a second switch nested under the first switch. The plurality of rules are processing using the hierarchy of switches, in embodiments. In an embodiment, bytecode is generated based on the processing of the plurality of rules using the hierarchy of switches.

Example Systems

Referring to the drawings in general, and initially to FIG. 1, a block diagram illustrating an example of a computing environment 100 in which embodiments of the present disclosure may be employed is provided. It should be understood that the placement, arrangement, quantity, and arrows regarding various components are abstractions and are non-limiting examples. Thus, it should also be understood that the computing environment 100 shown in FIG. 1 is only one example of a suitable computing environment 100, and this example has been simplified for ease of discussion. Accordingly, other components, quantities thereof, and arrangements may be used additionally or instead of that which is depicted, such that other components not shown may also be included and/or one or more of the shown components may be omitted, in various embodiments. Each of the components of FIG. 1 may be implemented using any type or quantity of computing devices, in embodiments. Further, the components shown may be implemented as discrete components, distributed components, or in conjunction with other components, and in any suitable combination and physical or virtual location. The components may communicate with each other directly or indirectly, using physical hardwired connections and/or wireless communications, for example, through a network (e.g., telecommunication network, a local area network (LANs), a wide area network (WANs), and/or a peer-to-peer-network). As such, each or any of the components may be implemented via a single device or multiple devices cooperating in a distributed environment. Additionally, the functions described herein as being performed by one or more components, entities, and/or devices may be carried out by hardware, firmware, and/or software, in various embodiments, such that the functions are not limited unless explicitly described as such.

In embodiments, the computing environment 100 includes a compiler 104. The computing environment 100 may further comprise a virtual machine 108, in embodiments. At a high level, source code 102 is input to the compiler 104, the compiler 104 compiles the source code 102 into bytecode 106, the bytecode 106 is output from the compiler 104 and provided to a virtual machine 108, in some embodiments. Generally, the virtual machine 108 may execute or "run" the bytecode within a runtime environment and may provide information to an operating system 110, such as support for a decision making system.

The source code 102 may include a file, such as a rules set comprised of a plurality of individual rules, in embodiments. The individual rules may support downstream decision making by an engine or virtual machine configured to evaluate facts against the rules, in various embodiments. The source code 102 may be input to the compiler 104, in embodiments. The compiler 104 comprises a computer program that is specially configured to convert or transform source code from one form into computer executable instructions that, unlike the source code input to the compiler 104, can be read and executed by another computer program via the engine and/or virtual engine. The compiler 104 may be a Java compiler, e.g., javac compiler, in one embodiment. In another embodiment, the compiler 104 may operate to transform source code into bytecode 106, which can be run using another computer programming language. Bytecode refers to a computer instruction set generated by a compiler from source code. The bytecode 106 may be run by a virtual machine 108, such as a Java Virtual Machine (JVM). The bytecode generated by the compiler may be stored in a file with an extension of .class, referred to herein as a "class file." For example, a Java compiler may generate a bytecode file identified as "Frame.class" that can be run by a JVM. An operating system 110 may then be supported by the virtual machine that runs the computer instruction set that is the bytecode 106. Although Java is discussed herein, the embodiments are not limited to one particular computer programming language such that the systems, methods, and media provided herein can be implemented using other computer programming languages and are contemplated to be within the scope of invention.

Figure 2:
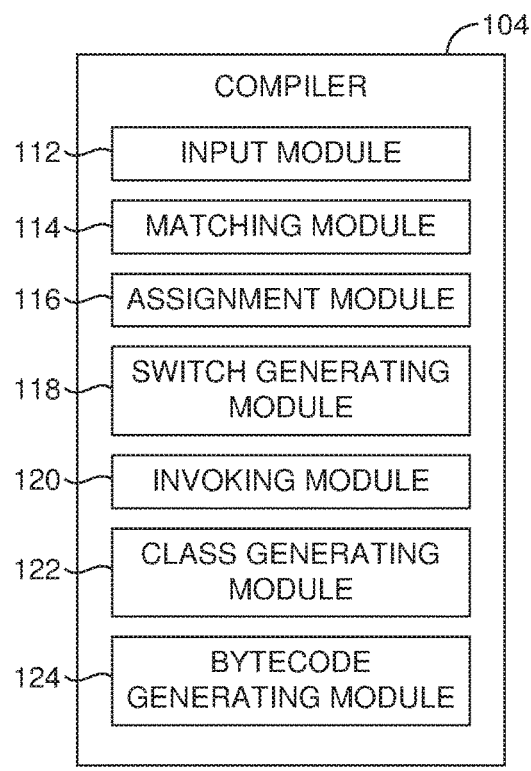
FIG. 2 depicts an example of a compiler from the computing environment of FIG. 1, in accordance with the present invention.

FIG. 2 provides a block diagram of an example compiler, such as the compiler 104 of FIG. 1. The compiler 104 comprises an input module 112, in embodiments. The input module 112 may retrieve, obtain, or receive a rules set comprised of a plurality of rules. For example, a rules set may include thousands of individual rules or hundreds of thousands of individual rules. Each of the individual rules may encode one or more conditions and one or more action codes, in various embodiments. Within an individual rule, a condition may be a predicate that is evaluated as "true" when the condition of the rule is satisfied or evaluated as "false" when the condition of the rule is not satisfied by a fact, for example. An action code specifies an action to be performed, for example, when the condition of the rule is satisfied ("true"), or specifies an action to be performed when the condition of the rule is not satisfied ("false").

The compiler 104 comprises a matching module 114, in embodiments. The matching module 114 is configured to identify the action codes that are encoded in each of the individual rules, compare the action codes of the individual rules to one another, and determine whether when two or more different individual rules specify the same action code, in various embodiments. As such, the matching module 114 operates to compare the action codes across rules and determine which specific rules identify action codes, in an embodiment. The matching module 114 may therefore determine when action codes match one another within the plurality of rules, in embodiments. Action codes specified within different individual rules may be identified as "matching," in embodiments, when the action codes specify the same action to be performed based on the predicate. Action codes can be recognized as matching between a plurality of individual rules, independent of whether the respective individual rules specify the same or different conditions/predicates, in an embodiment. In some embodiments, the matching module 114 de-duplicates the plurality of action codes within the rules. For example, the matching module 114 may determine that among the 10,000 rules obtained, each encoding an action code (e.g., 10,000 action codes), there are approximately 2,000 unique action codes (e.g., non-redundant action codes). As such, the action codes can be de-duplicated to remove the redundant action codes.

The compiler 104 comprises an assignment module 116, in embodiments. The assignment module 116 is configured to assign a plurality of unique identifiers to the plurality of action codes based on, in response to, or subsequent to de-duplication, in embodiments. In one embodiment, each of the plurality of unique identifiers is represented using a string of bits. Additionally, in some embodiments, identifiers are assigned as sequential numbers, beginning with zero. In embodiments, each one of a plurality of unique identifiers is assigned to one of the non-redundant plurality of action codes, one a one-to-one ratio. For example, for 2,000 unique action codes specified in the 10,000 individual rules, 2,000 unique action identifiers could be assigned as sequential numbers, beginning with the identifier "0" (zero) for a first action code and ending with the unique identifier "1999" for the last action code. Accordingly, each unique action code has a corresponding identifier that uniquely identifies a particular action code, in embodiments. Based on de-duplication and assignment of a unique identifier to each unique action code, two or more rules that were determined to have matching action codes may be associated with the same unique action code identifier, in embodiments. In one example, 100 or more different rules determined to have matching action codes could each point to the same action code identifier "1349" (e.g., points to one particular action code corresponding to the identifier).

In embodiments, the compiler 104 includes a switch generating module 118. The switch generating module 118 is configured to generate one or more switches, also referred to interchangeably as "switch statements" and "switch expressions." In an embodiment, the switch generating module 118 generates a hierarchy of switches, where at least one switch is nested below another switch. The hierarchy of switches may process the rules by processing the plurality of unique identifiers for the action codes encoded in the rules, in various embodiments. In further embodiments, each switch in the hierarchy is configured to process n or fewer quantity of bits of a unique identifier. As such, for example, the hierarchy of switches may include at least a first switch and a second switch nested under the first switch, where each of the first switch and the second switch are configured to process n or fewer bits. In such an example, for each of the plurality of identifiers, the first switch may process a first sequential portion of n or fewer bits of the unique identifier, and then a second switch may process the next (i.e., second) sequential portion of n or fewer bits of the unique identifier, and so on, until all the bits of a unique identifier have been processed by the nested switches.

The compiler 104 comprises an invoking module 120, in embodiments. The invoking module 120 may invoke the action code that corresponds to the unique identifier. In some embodiments, the invoking module 120 invokes an action code that corresponds to a unique identifier when all of the quantity of bits of a unique identifier for an action code of a rule have been processed by the hierarchy of switches. For example, when a nested switch processes the terminal bit(s) or last remaining bit(s) of an identifier that was passed down through the hierarchy of switches, the identifier can be used to identify the corresponding action code, and a method corresponding to the action code can be identified and invoked by the invoking module 120. In this manner, the identifiers assigned to the action codes remaining after de-duplication are utilized in order to transform the rules in the source code into invoked methods, for generating bytecode.

Continuing, the compiler 104 comprises a class generating module 122, in embodiments. The class generating module 122 assigns the invoked method to a hierarchy of classes, in embodiments. The class generating module 122 may assign the method invoked to a class, so long as that class does not exceed a predetermined or predefined method per class limit, in embodiments. When the method per class limit is met for a particular class, for example, the class generating module 122 may generate an additional class, where that additional class is derived from an existing class (for which the method per class limit is met) and inherits the characteristics of the existing class. The invoked method can then be assigned to the new, additional class, in such an example. In embodiments, a plurality of derived classes are generated to form a hierarchy of classes, concurrently with the processing performed by the hierarchy of switches. In such embodiments, each of the derived classes inherits the same characteristics and each of the derived classes adhere to the predetermined or predefined method per class limit enforced by the class generating module 122. Accordingly, the class generating module 122 may continue to assign methods to classes in an on-going manner as methods are invoked, via the hierarchy of switches, and may generate new, additional derived classes in order to adhere to the method per class limit, in embodiments.

The compiler 104 comprises a bytecode generating module 124. In embodiments, the bytecode generating module 124 generates bytecode based on the processing of the plurality of rules using the hierarchy of switches. For example, the bytecode may be generated by the bytecode generating module 124 utilizing the classes to which the switch-invoked methods are/have been assigned. The bytecode can be packaged into a single file, for example, a JAR file. The file comprising the bytecode can be output from the compiler 104 and provided to an engine or virtual machine, in some embodiments. For example, the file comprising the bytecode may be provided by compiler 104 to a virtual machine that runs the bytecode in order to evaluate facts.

Having described the computing environment 100, compiler 104, and components thereof, it will be understood by those of ordinary skill in the art that FIGS. 1 and 2 provide but one example of a suitable environment and system, and thus, are not intended to limit the scope of use or functionality of the present invention. Similarly, the computing environment 100 and the compiler 104 should not be interpreted as imputing any dependency and/or any requirements with regard to each component and combination(s) of components illustrated in FIGS. 1 and 2. It will be appreciated by those of ordinary skill in the art that the location of components illustrated in FIGS. 1 and 2 are examples, as other methods, media, hardware, software, components, and devices for establishing communication links between the components shown in FIGS. 1 and 2 may be utilized in implementations of the present invention. It will be understood to those of ordinary skill in the art that the components may be connected in various manners, hardwired or wireless, and may use intermediary components that have been omitted or not included in FIGS. 1 and 2 for simplicity's sake. As such, the absence of components from FIGS. 1 and 2 should not be interpreted as limiting the present invention to exclude additional components and combination(s) of components. Moreover, though components are represented in FIGS. 1 and 2 as singular components, it will be appreciated that some embodiments may include a plurality of devices and/or components such that FIGS. 1 and 2 should not be considered as limiting the quantity of a device or component.

Example Methods

Figure 3:
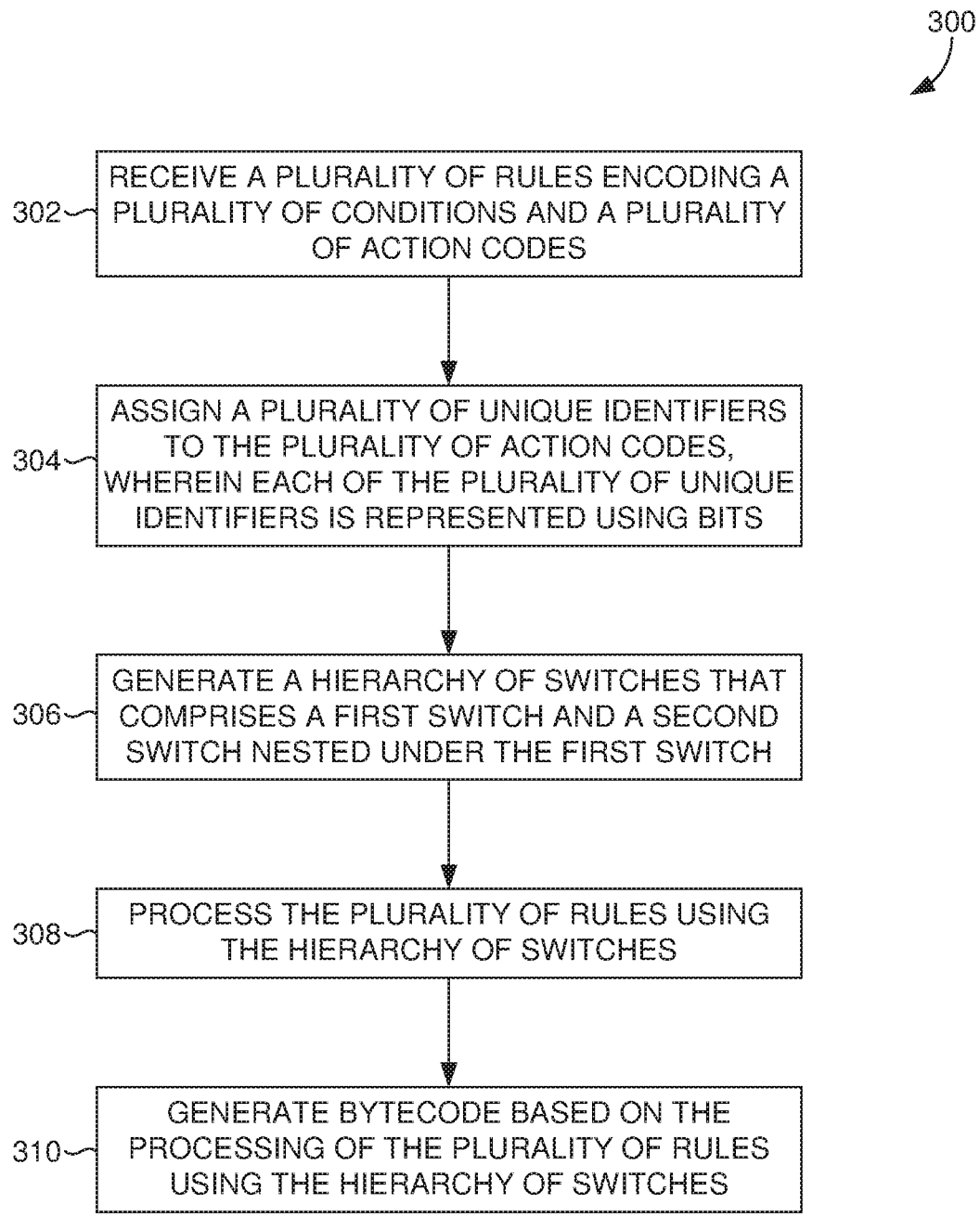
FIG. 3 illustrates a flow chart of a method for compiling rules into bytecode in accordance with an embodiment.
Figure 4:
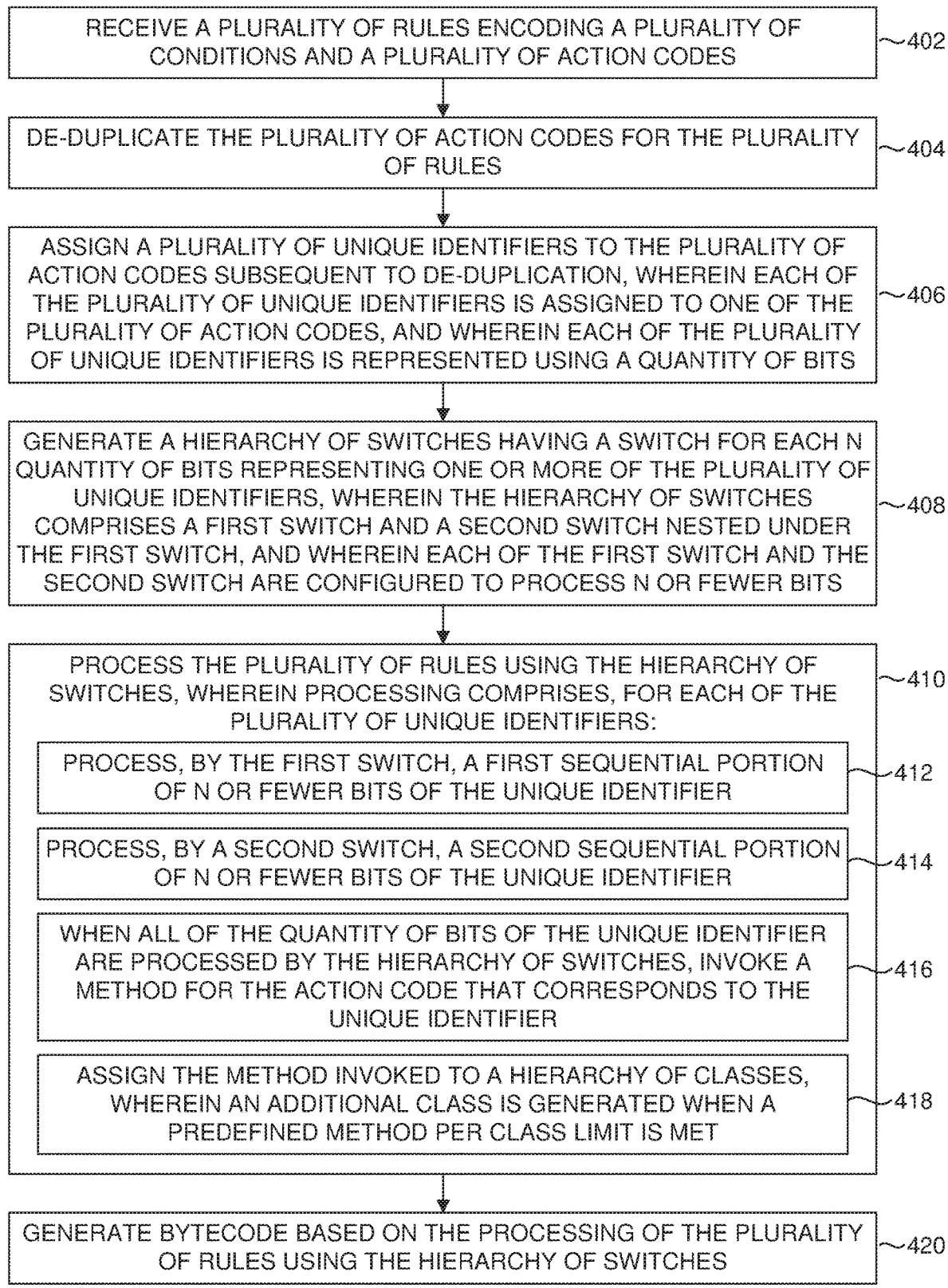
FIG. 4 illustrates a flow chart of another method for compiling rules into bytecode in accordance with an embodiment.

Turning now to FIGS. 3 and 4, methods are discussed that can be performed via one or more of the components and component interactions previously described in FIGS. 1 and 2. As such, the methods are discussed briefly for brevity, though it will be understood that the previous discussion and details described therein can be applicable to aspects of the methods of FIGS. 3 and 4. Additionally or alternatively, it will be understood that the methods discussed in FIGS. 3 and 4 can be implemented or performed via the execution of computer-readable instructions stored on computer readable media, by one or more processors.

Turning to FIG. 3, a method 300 is shown for compiling rules into bytecode. The method 300 may be computer-implemented using a computing device, in some embodiments. In one embodiment, one or more non-transitory computer-readable storage media having computer-readable program code portions or instructions embodied thereon are used to implement the method 300. For example, computer-readable program code portions may comprise one or more executable portions that are configured to perform the method 300. In another example, one or more computer storage media store computer-useable instructions that, when used by a computing device, cause the computing device to perform a method for compiling rules into bytecode. The computer-readable program code and/or computer-useable instructions may correspond to a computer application and/or application programming interface (API), wherein the application or API is used to implement and/or perform the method 300, in some embodiments. As further discussed below, the method 300 may be performed using a computing device having one or more of the components shown in FIGS. 1 and 2, such as the compiler 104.

Beginning at block 302, a plurality of rules encoding a plurality of conditions and a plurality of action codes is received. In some embodiments, an input module, such as the input module 112 of FIG. 2, may receive, retrieve, and/or obtain a plurality of rules encoding a plurality of conditions and a plurality of action codes. Additionally, the plurality of rules may be cleansed and de-duplicated, in some embodiments.

At block 304, a plurality of unique identifiers are assigned to the plurality of action codes, and each of the plurality of unique identifiers is represented using bits. In some embodiments, an assignment module, such as the assignment module 116 of FIG. 2, may assign a plurality of unique identifiers to the plurality of action codes, where each of the plurality of unique identifiers is represented using a unique string of bits. For example, in some embodiments, the plurality of unique identifiers assigned are sequential numbers. In such an example, sequential numbers are used for the unique identifiers because the sequential numbers may be converted to a bit string by the compiler. Additionally, in such an embodiment, the bit string may be split, divided, or apportioned into discrete portions having a specific bit quantity or "length." In some embodiments, the plurality of action codes are de-duplicated prior to the assignment of the plurality of unique identifiers, which reduces the overall total quantity of action codes.

A hierarchy of switches is generated which comprises a first switch and a second switch nested under the first switch, shown at block 306. In some embodiments, a switch generating module, such as the switch generating module 118 of FIG. 2, may generate the hierarchy of switches that comprises, at least, the first and second nested switches. In an embodiment, the hierarchy of switches comprises a plurality of nested switches, which may include any quantity of switches, and any quantity of levels of nested switches. Each of the plurality of nested switches may be switch statements, in some embodiments. Additionally, in an embodiment, each of the switch statements is configured to execute a limited quantity of bits.

At block 308, the plurality of rules are processed using the hierarchy of switches. In embodiments, for each of the plurality of unique identifiers assigned to the unique action codes of the rules, bits of the unique identifier are split, divided, and/or apportioned into at least a first sequential portion (e.g., having a bit length) and a second sequential portion (e.g., having a bit length), where each of the first sequential portion and the second sequential portion comprise n or fewer bits (i.e., where "n" is a predefined integer that acts as a threshold or limit). In an embodiment, the first sequential portion of one unique identifier is processed using a first switch, and as such, the first switch processes only n or few bits of the unique identifier. The remaining bits of the unique identifier, including the second sequential portion, are passed from the first switch to the second switch, in embodiments. Then, the second sequential portion of the unique identifier is processed using a second switch that is nested below the first switch, and as such, the second switch processes only n or fewer bits of the unique identifier, in embodiments. The switches in the hierarchy continue to process a limited quantity of bits for each identifier, passing the remaining bits "down" to a lower-level switch until all the bits of the identifier have been processed. In embodiments, the switches may process the same quantity of bits at each level, or alternatively, each switch may handle a different quantity of bits independent of the level in the hierarchy. Each individual, unique action code identifier is processed using the hierarchy of switches in order to process the rules having the action codes that are assigned to particular action code identifiers.

For example, a first unique action code identifier "1999" comprises a bit string of 44 bits. In this example, a first switch processes a first sequential portion of the identifier that is 8 or fewer bits (e.g., the bit length of the first sequential portion is 8 or fewer bits). The remaining bits of the first unique action code identifier "1999" that were not processed by the first switch (i.e., <44 bits) are passed to a second switch, which processes a second sequential portion of the identifier that is 8 or fewer bits (e.g., bit length of second sequential portion is 8 or fewer bits). In this example, the remaining bits of the first unique action code identifier "1999" that were not processed by the first and second switch are passed to a third switch, and the third switch which processes a third sequential portion of the identifier that is 8 or fewer bits. In the example, the remaining bits are passed down one level in the hierarchy of switches until all 44 bits of the first unique action code identifier "1999" have been processed.

When all of the bits of a unique action code identifier have been processed within the hierarchy of switches, such that a nested switch has processed the final bit in the identifier, a method may be invoked, in embodiments. The method corresponds to an action code, and the action code corresponds to the unique identifier that is/was processed, in one embodiment. The method invoked is assigned, in an embodiment, to a hierarchy of classes, where each class in the hierarchy of classes has a limit on the quantity of methods that are allowed per class, enforced by the compiler. Methods are thus invoked and assigned to a class, for example, for each action code identifier that is processed using the hierarchy of switches, as discussed above, until all the plurality of rules are processed. In some embodiments, a compiler may determine a fixed quantity of classes that are to be generated based on the plurality of action codes remaining after de-duplication. In further embodiments, the hierarchy of classes comprises a Java-based Frame Class. In one such embodiment, each of the classes are derived from the Frame Class and each class in the hierarchy inherits characteristics of the Frame Class.

Then, at block 310, bytecode may be generated based on the processing of the plurality of rules using the hierarchy of switches. In some embodiments, a bytecode generating module, such as the bytecode generating module 124 of FIG. 2, is used to generate bytecode based on the switches' processing. The bytecode is generated based on the methods assigned to the classes, the methods being invoked based on the hierarchal switch processing of the action code identifiers, in embodiments. The bytecode may be output from a compiler, such as the compiler 104 of FIGS. 1 and 2, and provided to an engine or virtual machine for running the bytecode.

Continuing to FIG. 4, yet another method 400 is shown for compiling rules into bytecode. The method 400 may be a computer-implemented method, in some embodiments. In one embodiment, one or more non-transitory computer-readable storage media having computer-readable program code portions or instructions embodied thereon are used to implement the method 400. For example, computer-readable program code portions may comprise one or more executable portions that are configured to perform the method 400. The computer-readable program code may correspond to a computer application and/or application programming interface (API), wherein the application or API is used to implement and/or perform the method 400, in some embodiments. As further discussed below, the method 400 may be performed using one or more of the system components shown in FIGS. 1 and 2, such as the compiler 104. It will also be understood from this description that some aspects of the method 400 of FIG. 4 have been described previously herein, including components utilized for specific aspects, and as such, aspects may be discussed briefly hereinafter.

In the method 400, a plurality of rules that encode a plurality of conditions and a plurality of action codes are received, shown at block 402. The plurality of action codes for the plurality of rules may be de-duplicated, as illustrated at block 404. By de-duplicating the action codes, the total quantity of unique action codes in the plurality of rules is reduced, which reduces the load on the compiler and improves the throughput of the compiler when compiling the plurality of rules, as discussed above. A plurality of unique identifiers are assigned to the plurality of action codes subsequent to de-duplication, at block 406, such that each of the plurality of unique identifiers is assigned to one of the plurality of action codes. In embodiments, each of the plurality of unique identifiers is represented using a fixed quantity of bits.

At block 408, a hierarchy of switches is generated having a switch for each n quantity of bits representing one or more of the plurality of unique identifiers. In some embodiments, the hierarchy of switches comprises at least a first switch and a second switch nested under the first switch. In one embodiment, each of the first switch and the second switch are configured to process n or fewer bits. In this manner, the switch symbol length limit is avoided, as previously discussed. As such, each switch may be configured with a bit limit that is 8 or fewer bits, in some embodiments. In another embodiment, each switch may be configured with a bit limit that is 7 or fewer bits. Each switch may be configured, in some embodiments, with a bit limit that is 6 or fewer bits. In yet another embodiment, each switch may be configured with a bit range, such as a range of, for example, three to eight bits, four to seven bits, or five to seven bits. It will be understood that these are merely illustrative examples and should not be construed as limiting. For example, when the bit string for a first unique identifier is 144 bits in length, at least one switch may be generated for every seven bits, such that at least 21 nested switches are generated for the 144 bit string. In another example, when the bit string for a second unique identifier is 20 bits in length, at least one switch may be generated for every five bits, such that at least four nested switches are generated for the 20 bit string.

In one embodiment, a first unique identifier is selected from the plurality of unique identifier. The first unique identifier may be selected, in one embodiment, based on the first unique identifier having the greatest quantity of bits (i.e., longest bit string length) relative to the other unique identifiers. In yet another embodiment, the first unique identifier may be selected based on having the highest sequential identifier relative to the other unique identifiers (e.g., selection of identifier "1999" as highest 'numbered' identifier of the plurality of identifiers for 2000 action codes post-de-duplication, wherein lowest 'numbered' identifier is zero). In some embodiments, the total quantity of bits representing the first unique identifier is divided by n quantity of bits, wherein n is eight or fewer bits. In another embodiment, the total quantity of bits representing the first unique identifier is divided by n quantity of bits, wherein n is seven or fewer bits. In yet another embodiment, the total quantity of bits representing the first unique identifier is divided by n quantity of bits, wherein n is between four and seven bits. Further, in such an embodiment, based on the dividing, the compiler determines to generate one switch in the hierarchy of switches for each n quantity of bits of the first unique identifier. As such, the quantity of nested switches to be generated when creating the hierarchy of switches may be determined by the compiler, for example, based on one or more specific identifiers selected from the plurality.

Continuing with the method 400, the plurality of rules are processed using the hierarchy of switches, at block 410. At block 412, a first sequential portion of n or fewer bits of the unique identifier is processed by the first switch. In embodiments, the second sequential portion of the unique identifier is handed off, from the first switch to the second switch, in response to the first switch processing the first sequential portion of n or fewer bits of the unique identifier. This aspect is repeated as each of the plurality of unique identifiers is processed by the hierarchy of switches. At block 414, a second sequential portion of n or fewer bits of the unique identifier is processed by the second switch. This aspect is repeated as each of the plurality of unique identifiers is processed by the hierarchy of switches. In further embodiments, a third portion of the unique identifier is passed, from the second switch to a third switch, in response to the second switch processing the second sequential portion of n or fewer bits of the unique identifier. Then, in one embodiment, a third switch processes a third sequential portion (e.g., a terminal sequential portion) of n or fewer bits of the unique identifier, wherein the third switch is nested under the second switch that is nested under the first switch in the hierarchy of switches. This aspect is repeated as each of the plurality of unique identifiers that is processed by the hierarchy of switches.

At block 416, when all of the quantity of bits of the unique identifier are processed by the hierarchy of switches, a method is invoked that corresponds to the action code, that further corresponds to the unique identifier processed. This aspect of invoking methods is repeated as each of the plurality of unique identifiers is processed by the hierarchy of switches. At block 418, the method invoked is assigned to a hierarchy of classes, wherein an additional class is generated when a predefined method per class limit is met. In some embodiments, the additional class is generated in a hierarchy of classes when the predefined method per class limit is met based on the method being invoked. In various embodiments, one or more additional classes that are generated are derived from an existing class.

In further embodiments, a hierarchy of classes is generated for the methods that are to be/are being invoked. In one embodiment, the total quantity of the plurality of action codes that remain subsequent to de-duplication is determined. In one such embodiment, a total quantity of methods per class to be permitted (i.e., a method per class limit) is determined, referenced, or specified. Based on the total quantity of the plurality of action codes that remain subsequent to de-duplication and the total quantity of methods per class to be permitted, the compiler may determine a total quantity of classes to generate for the hierarchy of classes, in embodiments. For example, when the compiler determines that the total quantity of unique action codes is 220,000+, for example, and the compiler determines a limit of 10,000 methods per class, the compiler may determine that 22 classes are to be generated in the hierarchy of classes to which methods are to be assigned. As such, the compiler may determine a fixed quantity of classes that are to be generated based on the plurality of action codes remaining after de-duplication. Further, this avoids the class size limits discussed previously. In some embodiments, the hierarchy of classes comprises a Java-based Frame Class. For example, a first class $Frame_0$ may be generated and another derived class Framer may be generated, and so on. In one such embodiment, each of the classes derived from the Frame Class inherits characteristics of the Frame Class. The invoked methods may be assigned to classes within this hierarchy of classes, and additional derived classes may be added to the hierarchy at each instance where the method per class limit is reached.

At block 420, bytecode is generated based on the processing of the plurality of rules using the hierarchy of switches.

Example Operating Environment

Figure 5:
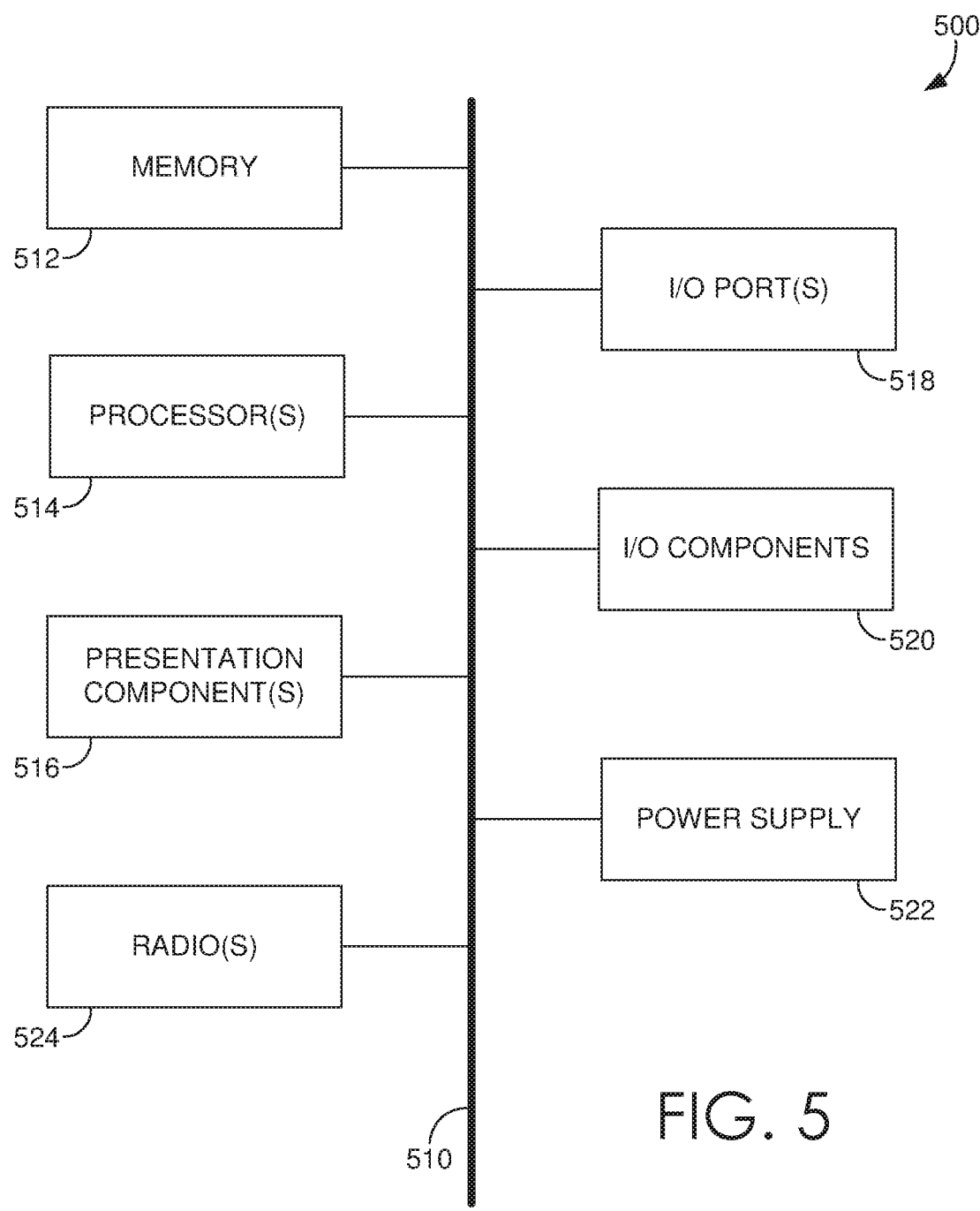
FIG. 5 illustrates an example of a device in accordance with an embodiment.

Having described implementations of the present disclosure, an exemplary operating environment in which embodiments of the present invention may be implemented is described below in order to provide a general context for various aspects of the present disclosure. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope. The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. From the foregoing, it will be seen that this invention is one well adapted to attain all the ends and objects set forth above, together with other advantages which will be understood from this description and/or which may be inherent to the systems, methods, and media. It will be understood that certain features and subcombinations are of utility and may be employed without reference to other features and subcombinations. This is contemplated by and is within the scope of the claims.

Regarding FIGS. 1-5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the quantity of a devices and/or components.

It is noted that embodiments of the present invention described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps. Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more computer storage media storing computer-useable instructions that, when used by a computing device, cause the computing device to perform operations for compiling rules into bytecode, the operations comprising:
receiving a plurality of rules encoding a plurality of conditions and a plurality of action codes;
assigning a plurality of unique identifiers to the plurality of action codes,
wherein each of the plurality of unique identifiers is represented using bits;
generating a hierarchy of switches that comprises a first switch and a second switch nested under the first switch;
processing the plurality of rules using the hierarchy of switches; and
generating bytecode based on the processing of the plurality of rules using the hierarchy of switches.

2. The computer storage media of claim 1, wherein the operation of processing the plurality of rules using the hierarchy of switches further comprises, for each of the plurality of unique identifiers, splitting the bits of the unique identifier into at least a first sequential portion and a second sequential portion, wherein each of the first sequential portion and the second sequential portion comprise n or fewer bits.

3. The computer storage media of claim 2, wherein the operation of processing the plurality of rules using the hierarchy of switches comprises, for each of the plurality of unique identifiers, processing, by the first switch, the first sequential portion.

4. The computer storage media of claim 3, wherein the operation of processing the plurality of rules using the hierarchy of switches comprises, for each of the plurality of unique identifiers, processing, by the second switch, the second sequential portion.

5. The computer storage media of claim 1, wherein the operation of processing the plurality of rules using the hierarchy of switches comprises, for each of the plurality of unique identifiers, invoking a method for the action code that corresponds to the unique identifier.

6. The computer storage media of claim 5, wherein the operation of processing the plurality of rules using the hierarchy of switches comprises, for each of the plurality of unique identifiers, assigning the method invoked to a hierarchy of classes, wherein the hierarchy of classes imposes a limit on methods allowed per class.

7. The computer storage media of claim 6, wherein the hierarchy of classes comprises a Java-based Frame Class.

8. The computer storage media of claim 1, wherein the operations further comprise de-duplicating the plurality of action codes prior to assigning the plurality of unique identifiers.

9. The computer storage media of claim 8, wherein the operations further comprise determining a quantity of classes to generate based on the plurality of action codes remaining after de-duplication.

10. The computer storage media of claim 1, wherein the hierarchy of switches comprises a plurality of nested switches, wherein each of the plurality of nested switches are switch statements, and wherein each of the switch statements executes a limited quantity of bits of the plurality of unique identifiers.

11. One or more computer storage media storing computer-useable instructions that, when used by a computing device, cause the computing device to perform operations for compiling rules into bytecode, the operations comprising:
receiving a plurality of rules encoding a plurality of conditions and a plurality of action codes;
de-duplicating the plurality of action codes for the plurality of rules;
assigning a plurality of unique identifiers to the plurality of action codes subsequent to de-duplication, wherein each of the plurality of unique identifiers is assigned to one of the plurality of action codes, and wherein each of the plurality of unique identifiers is represented using a quantity of bits;
generating a hierarchy of switches having a switch for each n quantity of bits representing one or more of the plurality of unique identifiers, wherein the hierarchy of switches comprises a first switch and a second switch nested under the first switch, and wherein each of the first switch and the second switch are configured to process n or fewer bits;
processing the plurality of rules using the hierarchy of switches, wherein processing comprises, for each of the plurality of unique identifiers:
processing, by the first switch, a first sequential portion of n or fewer bits of the unique identifier;
processing, by the second switch, a second sequential portion of n or fewer bits of the unique identifier;
when all of the quantity of bits of the unique identifier are processed by the hierarchy of switches, invoking a method for the action code that corresponds to the unique identifier; and
assigning the method invoked to a hierarchy of classes, wherein an additional class is generated when a predefined method per class limit is met; and
generating bytecode based on the processing of the plurality of rules using the hierarchy of switches.

12. The computer storage media of claim 11, wherein the operations further comprise processing, by a third switch, a terminal sequential portion of n or fewer bits of the unique identifier, wherein the third switch is nested under the second switch that is nested under the first switch in the hierarchy of switches.

13. The computer storage media of claim 11, wherein the operations further comprise selecting a first unique identifier from the plurality of unique identifiers, wherein the first unique identifier having a greatest quantity of bits relative to other unique identifiers.

14. The computer storage media of claim 13, wherein the operations further comprise:
dividing a total quantity of bits representing the first unique identifier by n quantity of bits, wherein n is eight or fewer bits; and
determining, based on the dividing, to generate one switch in the hierarchy of switches for each n quantity of bits of the first unique identifier.

15. The computer storage media of claim 11, wherein the operations further comprise:
determining a total quantity of the plurality of action codes that remain subsequent to de-duplication; and
determining a total quantity of methods per class to be permitted; and
determining a total quantity of classes to generate for the hierarchy of classes, wherein the total quantity of classes is based on the total quantity of the plurality of action codes that remain subsequent to de-duplication and the total quantity of methods per class to be permitted.

16. The computer storage media of claim 11, wherein the operations further comprise handing off the second sequential portion of the unique identifier, from the first switch to the second switch, in response to the first switch processing the first sequential portion of n or fewer bits of the unique identifier.

17. The computer storage media of claim 16, wherein the operations further comprise handing off a third portion of the unique identifier, from the second switch to a third switch, in response to the second switch processing the second sequential portion of n or fewer bits of the unique identifier.

18. The computer storage media of claim 11, wherein the operations further comprise generating the additional class in the hierarchy of classes when the predefined method per class limit is met based on the method being invoked.

19. The computer storage media of claim 18, wherein one or more additional classes are derived from an existing class.

20. A method for compiling rules into bytecode, the method comprising:
   receiving a plurality of rules encoding a plurality of conditions and a plurality of action codes;
   assigning a plurality of unique identifiers to the plurality of action codes, wherein each of the plurality of unique identifiers is represented using bits;
   generating a hierarchy of switches that comprises a first switch and a second switch nested under the first switch;
   processing the plurality of rules using the hierarchy of switches; and
   generating bytecode based on the processing of the plurality of rules using the hierarchy of switches.

* * * * *